O. F. SCHROEDER.
TIRE ALARM.
APPLICATION FILED MAY 16, 1921.

1,391,513.

Patented Sept. 20, 1921.

Inventor.
O. F. Schroeder.
By Ackron & Totten
his Attorneys

UNITED STATES PATENT OFFICE.

OTTO FRED SCHROEDER, OF SANTA ANA, CALIFORNIA.

TIRE-ALARM.

1,391,513.  Specification of Letters Patent.  Patented Sept. 20, 1921.

Application filed May 16, 1921. Serial No. 470,125.

*To all whom it may concern:*

Be it known that I, OTTO FRED SCHROEDER, a citizen of the United States, residing at Santa Ana, in the county of Orange and State of California, have invented certain new and useful improvements in Tire-Alarms, of which the following is a specification.

This invention relates to an audible signal or alarm for indicating to the vehicle driver or occupant the condition of inflation of the vehicle tire, whereby on the deflation from any cause of the vehicle tire, a signal will be sounded on each successive revolution of the wheel.

One of the principal objects of the invention is to provide a simple construction adapted for use in connection with tires of various cross sectional diameters, thereby adapting one type of device for use in connection with all vehicles having pneumatic tires. A further object is to provide a construction operated on each successive revolution of the wheel by the distortion of that portion of the tire adjacent thereto as the same contacts with the road surface. Other objects will appear from the following specification.

Referring more particularly to the drawings wherein is disclosed the preferred embodiment of my invention—

Figure 1:
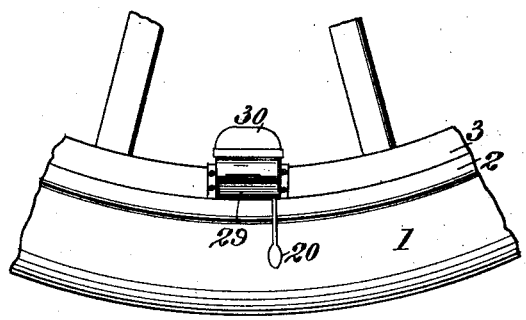
Figure 1 is a view in broken section of a vehicle wheel with my invention applied thereto.

1 is a pneumatic tire carried by the usual rim 2 mounted on a wheel felly 3. Secured to the felly in any suitable manner, as by screws 4, is a rectangular supporting base 5, from which extends the bell standard 6 mounting a bell 7. The base supports a frame consisting of the main portion 8 and the upwardly disposed parallel arms 9 and the downwardly extending parallel arms 10, both arranged at the same side of the base 5, said frame being secured to the base by a suitable means 11.

The upper ends of the arms 9 are connected by a shaft 12 and mounted thereon is a sleeve 13 radially from which extends a bell clapper 14, adapted for swinging, as in dotted lines, into engagement with the edge of the bell 7.

Radially from said sleeve 13, in line with the clapper 14, extends an arm 15 carrying a laterally disposed pin 16, with which is connected one end of a coiled operating spring 17.

Figure 2:
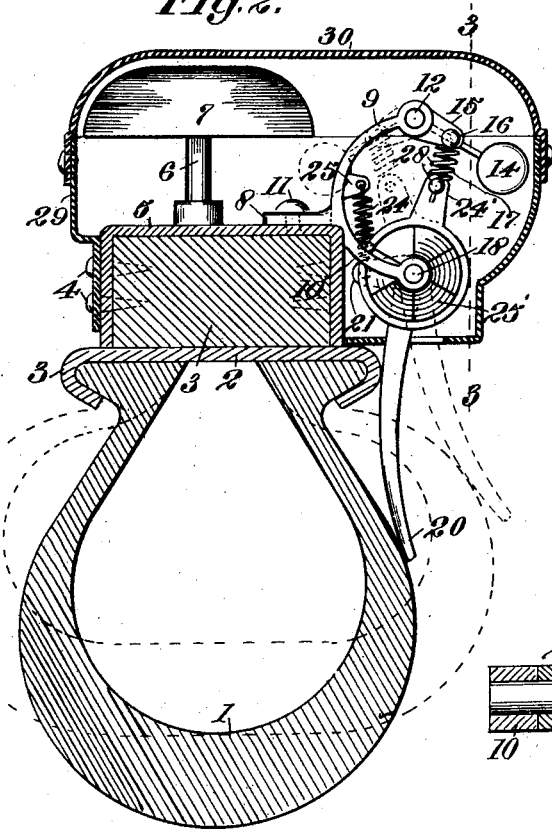
Fig. 2 is a transverse sectional view taken on line 2—2 of Fig. 3.

The arms 10 are connected by a shaft 18 rotatable in bearings at the ends thereof, and radially from one end of the shaft and pinned thereto, as at 19, extends the lever 20 disposed to contact with the side wall of the vehicle tire, as in Figs. 1 and 2 of the drawings.

The shaft 18 carries a radial arm 21 pinned thereto as at 22, and to the end of the lateral portion 23 of said arm is secured one end of a spring 24 attached to the frame 8 as at 25, said spring maintaining the lever 20 in contact with the side wall of the tire 1 at all times.

Figure 3:
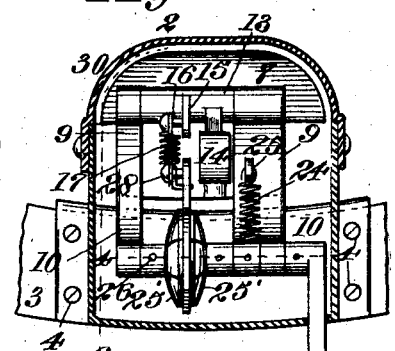
Fig. 3 is a sectional view on line 3—3 of Fig. 2.
Figure 4:
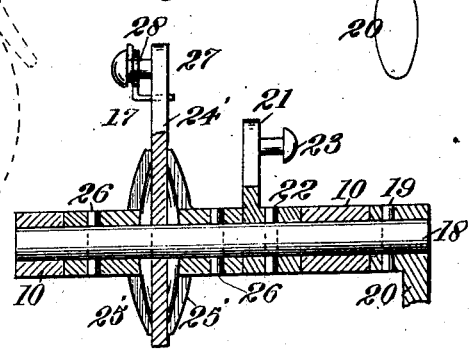
Fig. 4 is a sectional view on line 4—4 of Fig. 3.

A part 24' is carried by and rotatable about the shaft 18 between the radially slotted cupped compression plates 25', one positioned on each side thereof, and each pinned to rotate with the shaft, as at 26. The end of the part 24 is in the form of a lever 27 laterally from which extends a headed pin 28 which connects with the opposite end of the coiled operating spring 17—Figs. 2 and 3.

It will be observed that on each successive revolution of the tire, the portion thereof adjacent the alarm becomes flattened or distorted on contacting with the road, which operation moves the lever 20 a greater or less degree, assuming to the position in dotted lines—Fig. 2, causing the member 27 to move transversely of the shaft 12, compressing the spring 17 and causing a rapid movement of the clapper 14 from full to dotted line position—Fig. 2. On the compressed portion of the tire assuming its natural shape, the spring 24 returns the lever 20 and part 27 to their normal position, as in full lines—Fig. 2, and this movement causes a return of the clapper from dotted to full lines—Fig. 2 of the drawings.

By the members 25' frictionally engaging the part 24, adjustment of the member 24 about shaft 18 is permitted, adapting the device for use in connection with tires of different diameters.

If desirable, the device may be inclosed in the casing consisting of the body portion 29 and the removable cover 30.

I claim:—

1. A tire alarm device comprising a base for attachment to a wheel, a bell, a bell clapper associated with the bell and fulcrumed for swinging movement to and from the bell, an oscillating shaft, a lever associated therewith and disposed to extend adjacent to the side wall of a vehicle tire, a part movable with the shaft transversely across the fulcrum of the clapper, and a spring affording the sole operating connection between said part and the bell clapper.

2. A tire alarm device comprising a base for attachment to a wheel, a bell, a bell clapper associated with the bell and fulcrumed for swinging movement to and from the bell, an oscillating shaft, a lever connected with and extending therefrom to the side wall of the vehicle tire, a part extending radially of and frictionally movable with the shaft, and a coiled spring connecting said part and said clapper.

3. A tire alarm comprising a base for attachment to a wheel, a bell, a bell clapper associated therewith and fulcrumed for arcuate movement, an arm associated with the clapper for arcuate movement therewith, a shaft, a lever extending therefrom to a point adjacent the side wall of a vehicle tire and adapted for movement by the tire for imparting oscillating movement to the shaft, a part carried by and extending radially of the shaft with its free end adapted for arcuate movement with the oscillation of the shaft, and a spring connecting the free end of said part and said arm.

4. A tire alarm comprising a base for attachment to a wheel, a bell, a bell clapper associated therewith, an oscillating shaft, a lever extended therefrom to a point adjacent to the side wall of a vehicle tire and adapted for movement by the tire for imparting an oscillating movement to the shaft, a part carried by the shaft and capable of free movement thereon, a friction member carried by and movable with the shaft and bearing on said part, whereby said part is operated by the movement of the shaft, and a spring connecting said part and said bell clapper.

5. A tire alarm comprising a base for attachment to a wheel, an oscillating shaft, a lever extended therefrom to a point adjacent to the side wall of a vehicle tire and adapted for movement by the tire for imparting an oscillating movement to the shaft, a part carried by the shaft and capable of free movement thereon, a friction member keyed to the shaft and bearing on said part for imparting oscillating movement thereto on the oscillation of said shaft, an audible signal member carried by said base, an actuating member therefor, and a connection between said part and said actuating member.

In testimony whereof I have signed my name to this specification.

OTTO FRED SCHROEDER.